United States Patent [19]
Nikolaev et al.

[11] 3,735,912
[45] May 29, 1973

[54] APPARATUS FOR WELDING NONROTATABLE PIPE JOINTS

[76] Inventors: Vasily Ilich Nikolaev, ulitsa Amudsena, 5, korpus 4-9; Alexandr Jurievich Eliseev, Lomonosovsky prospekt, 19, kv. 45; Vladimir Petrovich Bogachev, ulitsa Fonvizina, 14, kv. 40; Artem Petrovich Prosvirin, Inzhenernaya ulitsa, 8, kv. 51; Vladimir Ionovich Konstantinopolsky, ulitsa Kibalgicha, 4/6, kv. 38; Anatoly Nikolaevich Belousov, proezd Cherskogo, 11, kv. 124, all of Moscow, U.S.S.R.

[22] Filed: July 27, 1970

[21] Appl. No.: 58,612

[52] U.S. Cl................228/28, 29/484, 219/60 A, 219/125, 228/29
[51] Int. Cl. ................................................B23k 5/00
[58] Field of Search.....................228/4, 6, 29, 30, 228/32, 45, 25, 28; 219/8.5, 124, 125, 69 V, 60 A; 29/484, 493

[56] References Cited

UNITED STATES PATENTS

| | | | |
|---|---|---|---|
| 3,560,696 | 2/1971 | Grinenko et al. | 219/60 A |
| 3,509,302 | 4/1970 | Fielder et al. | 228/29 X |
| 3,389,846 | 6/1968 | Claffey | 228/29 |
| 3,179,781 | 4/1965 | Ross et al. | 219/60 A |
| 3,035,147 | 5/1962 | Latter | 219/60 A |

*Primary Examiner*—J. Spencer Overholser
*Assistant Examiner*—Robert J. Craig
*Attorney*—Waters, Roditi, Schwartz & Nissen

[57] ABSTRACT

An apparatus for welding nonrotatable pipe joints, whose frame is by means of a fixing mechanism connected to one of the pipes to be welded together, while the torch moves along the joint by means of a rotating faceplate, said frame provided with a drive for its movement across the joint being movably mounted on said fixing mechanism, and carrying at least one circular guide for the rotational movement of the faceplate, whereon the torch is located.

6 Claims, 6 Drawing Figures

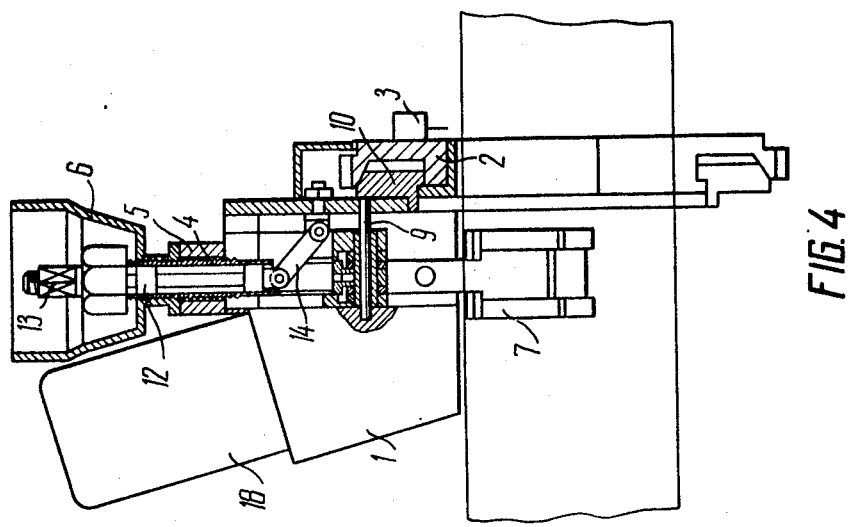
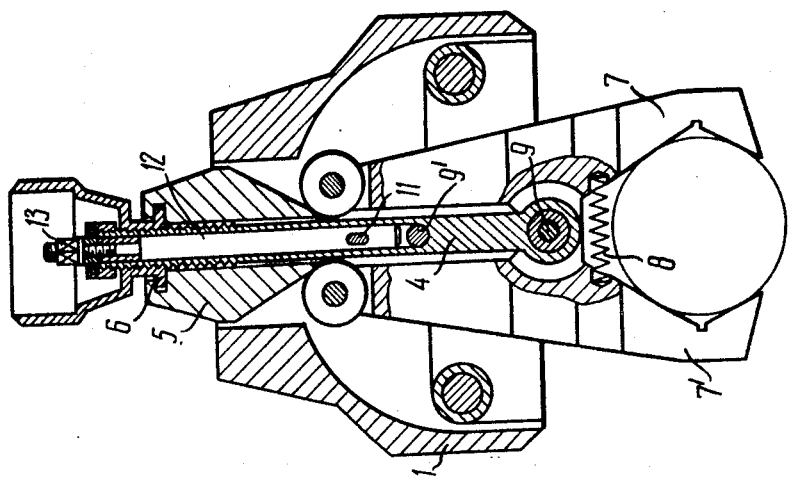

APPARATUS FOR WELDING NONROTATABLE PIPE JOINTS

The present invention relates to devices for welding nonrotatable pipe joints, mainly for gas-shielded welding with a nonconsumable electrode under cramped space conditions.

Known in the art is an apparatus for gas-shielded welding of nonrotatable pipe joints with a nonconsumable electrode.

This conventional apparatus comprises a frame which, by means of a fixing mechanism, is secured onto one of the pipes to be welded. Fixed in the frame are guides, on which a faceplate rotates along the joint. Disposed on the faceplate are a torch with the electrode, and a slide of the mechanism to move the torch across the joint.

The disadvantage of this apparatus lies in the location of the slide of the mechanism for moving the torch across the joint, on a faceplate rotating during the welding process. This impedes correcting movements of the torch during welding, since in this case the slide rotates together with the face-plate. Correcting the torch position across the joint in the intervals between the weld passes is also inconvenient since the control handle of the slide is located right near the torch and the pipes being welded, so that when moving the torch across the joint, the operator often burns his hands. The work is particularly difficult when the conventional apparatus is used in cramped construction conditions, for example, in the case when the adjacent pipes or other parts are located close to the faceplate. Additionally, location of the slide directly on the faceplate increases the size of the rotating parts of the apparatus, thus reducing the possibilities of its employment under cramped space conditions.

An object of the invention is to eliminate the aforementioned disadvantages.

The basic object of the invention is to provide an operationally versatile apparatus for welding nonrotatable pipe joints, which is especially advantageous use in for welding pipes under cramped conditions of construction work, for example, for welding pipes of the surfaces subjected to heating in heat power stations.

With this object in view, in an apparatus for welding nonrotatable pipe joints, whose frame is by means of a fixing mechanism connected to one of the pipes to be welded together, while the torch moves along the joint by means of a rotating faceplate, the frame, according to the invention, is provided with a drive for its movement across the joint, is movably mounted on said fixing mechanism, and carries at least one circular guide for the rotational movement of the faceplate, whereon the torch is located.

Advantageously, the drive to move the frame across the joint should comprise at least one guide rigidly attached to the frame and hinged to the fixing mechanism, and a drawbar kinematically communicating with the frame of the apparatus so that this drawbar is capable of reciprocal movement with respect to the fixing mechanism.

The kinematic communication of the drawbar with the apparatus frame can be provided in the form of a lever, one arm of which is connected to the drive guide, and the other arm to the drawbar of this drive.

The drawbar may also be kinematically communicated with the apparatus frame through a link, having one end which is hinged to the frame, and the other end to the drive drawbar.

A desirable construction is reached in the case, when kinematic communication of the drawbar with the frame of the apparatus is provided for in the form of a crank mechanism, for example, Evans mechanism, whose connecting rod has its one end hinged to the drive drawbar, and the other end linked to the apparatus frame, while the crank is hinged to the connecting rod and to the fixing mechanism.

Kinematic communication of the drawbar with the frame can also be accomplished through a screw pair, one of the elements of which is rigidly attached to the fixing mechanism, and the other one is hinged to the frame of the apparatus.

The idea of the invention is further elucidated by a description of exemplary embodiments thereof with references to the accompanying drawings, wherein:

FIG. 3 is section II—II in FIG. 2;

FIG. 4 shows another embodiment of the apparatus for welding nonrotatable pipe joints according to the invention (cross section)

Figure 1:
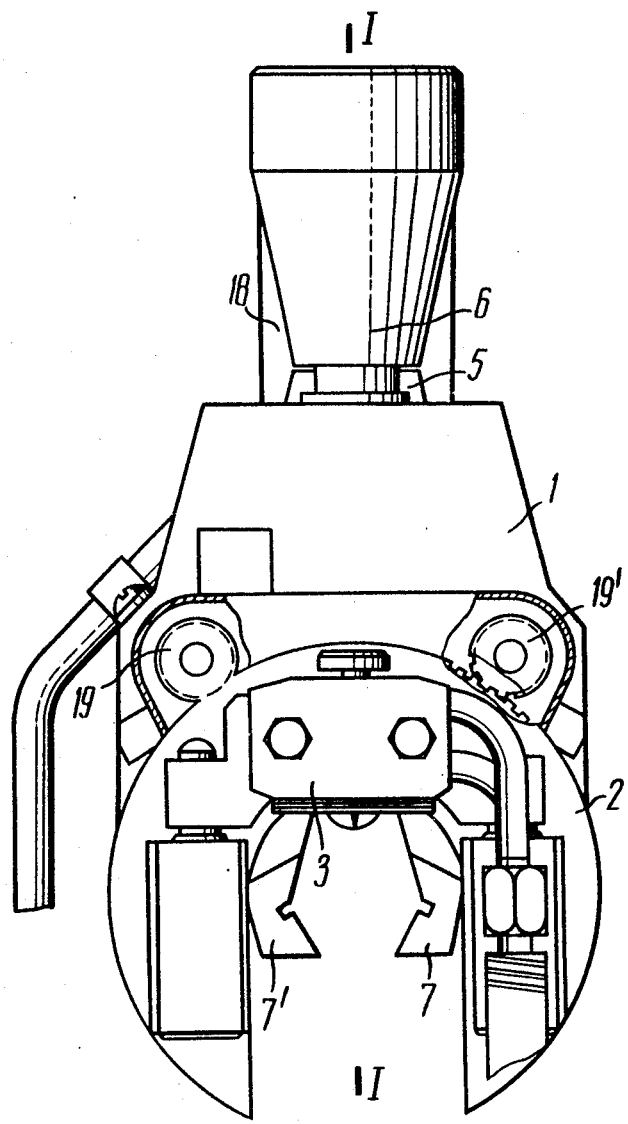
FIG. 1 shows a general view of the apparatus for welding nonrotatable pipe joints.

The apparatus for welding nonrotatable pipe joints comprises: a frame 1 (FIG. 1); a mechanism for fixing frame 1 onto one of the pipes to be welded together (in the figure the pipe is shown with a thin line); a faceplate 2 with a torch 3; a drive to move frame 1 across the joint, and a drive to rotate faceplate 2.

Figure 2:
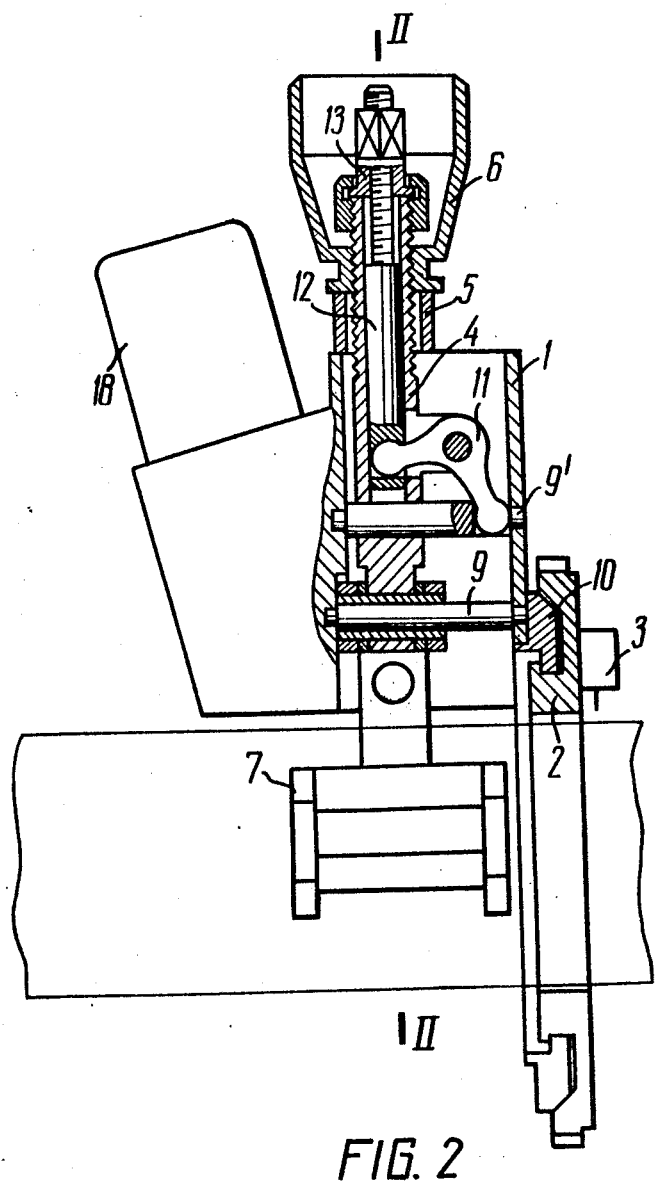
FIG. 2 is section I—I in FIG. 1.

The fixing mechanism comprises a screw 4 (FIGS. 2 and 3) made hollow and which is movably housed in frame 1, on the lead thread of which screw there being mounted a handle 6 kinematically communicating with a wedge 5.

Figure 6:
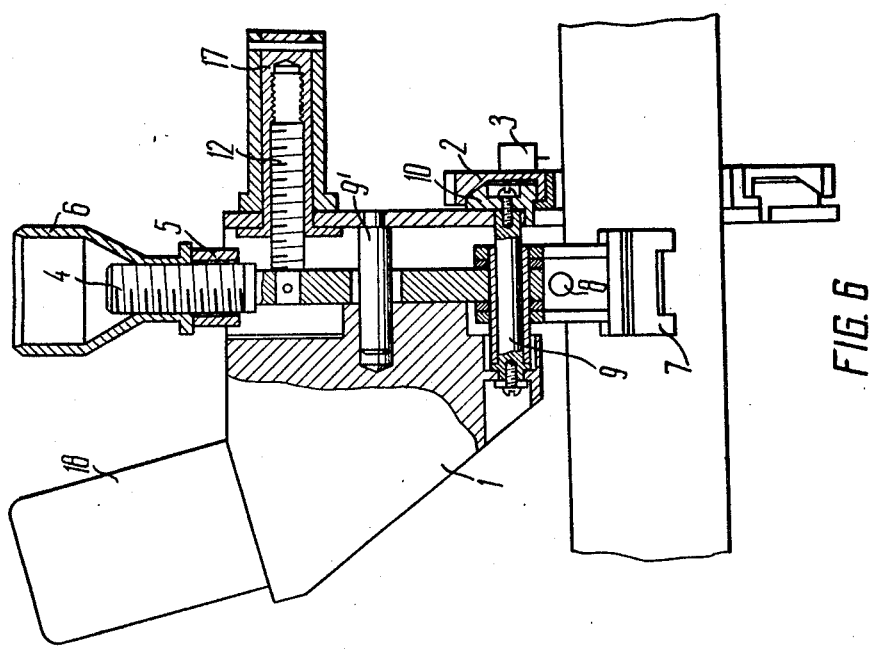
FIGS. 5 and 6 show further embodiments of the apparatus for welding nonrotatable pipe joints according to the invention (cross sections).
Figure 5:
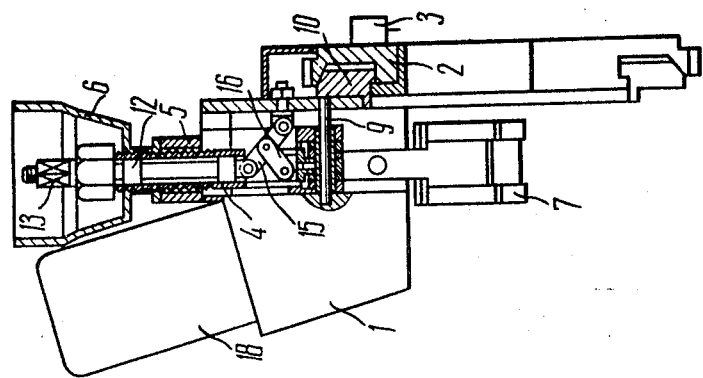

Pivotally secured on screw 4 are levers 7 and 7', whose upper ends are pressed to wedge 5 by means of spring 8, while the lower ends of these levers are made in the form of prisms to mount the apparatus on one of the pipes to be welded in accordance with its diameter. Frame 1 is movably connected with the fixing mechanism, and carries at least one guide 9 (FIGS. 4,5) to move said frame. Also possible are two cylindrical guides made in the form of rods 9 and 9' (FIGS. 2 and 6), and through holes drilled in screw 4 and levers 7 and 7' of the fixing mechanism. Attached to frame 1 is at least one circular guide 10 of faceplate 2.

The drive for moving frame 1 across the joint consists of a toggle lever 11 and a drawbar 12. Lever 11 is hinged in the body of screw 4, one arm thereof being linked to frame 1, and the other one to the bottom end of drawbar 12 of this drive. Available on the top end of drawbar 12 is a thread, screwed onto which is a nut 13 kinematically communicating with screw 4 of the fixing mechanism.

The drive to move frame 1 may also consist of a link 14 (FIG. 4) and drawbar 12, one end of link 14 being hinged to frame 1 of the apparatus, and the other end to drawbar 12.

Furthermore, the drive for traversing frame 1 can be formed as a crank mechanism (FIG. 5), for example, an Evans mechanism, wherein one end of connecting rod 15 is hinged to drawbar 12, and the other end is linked to frame 1 of the apparatus, while crank 16 is hinged to connecting rod 15 and to screw 4 of the fixing mechanism.

Finally, the drive for moving frame 1 may consist of a screw pair (FIG. 6), one of the elements of which is the drawbar 12 whose one end is secured in the body of screw 4 of the fixing mechanism, and the other element is a nut 17 kinematically communicating with frame 1 of the apparatus.

Alternatively, serving as the drive elements performing the kinematic communication of the frame with the drawbar may be: a worm pair; toothed pairs in combination with a screw pair; a rack gearing, one of the elements of the worm or the screw pair, as well as of the rack gearing, being connected to the fixing mechanism, and the other element to the frame of the apparatus.

The drive for rotating faceplate 2 (FIG. 1) comprises an electric motor 18 and a reduction gear (not shown in the figure) housed in said frame, and having at its outlet driving gears 19 and 19', which rotate in synchronism.

Faceplate 2 mounted on the circular guide 10 engages the driving gears 19 and 19' through its toothed rim. Faceplate 2 and the circular guide have cutouts for mounting the proposed apparatus on the pipe.

The present apparatus works as follows.

Before placing the apparatus on one of the pipes to be welded, the cutout of faceplate 2 (FIG. 1) is placed in coincidence with the cutout of the circular guide 10. For this purpose electric motor 18 is energized, its rotation being transmitted to faceplate 2 through the reduction gear and the driving gears 19 and 19'. The apparatus is placed on the pipe letting the latter extend through the cutouts in faceplate 2 and the circular guide 10.

By turning handle 6, wedge 5, which kinematically communicates with screw 4, is moved therealong to force apart the upper ends of levers 7 and 7'. The swiveling levers compress and center the pipe in their prisms, thus fixing the apparatus in its initial position. To adjust torch 3 to the required joint, nut 13 of the drive for moving frame 1 is turned (FIG. 2), which nut interacts with drawbar 12 imparting thereto reciprocal movement, and the latter, in turn, moves one of the arms of the toggle lever 11, the second arm thereof interacting with frame 1 to displace faceplate 2 with torch 3 across the weld.

In the case when kinematic communication between drawbar 12 and frame 1 is constructed in the form of a link, drawbar 12 moves link 14 (FIG. 4) and frame 1 hinged thereto, together with torch 3.

If kinematic communication between drawbar 12 and frame 1 is accomplished through an Evans mechanism, drawbar 12 interacting with connecting rod 15 and crank 16 (FIG. 5) of this mechanism moves frame 1 which is hinged thereto, together with torch 3.

In the case when kinematic communication of drawbar 12 with frame 1 is realized in the form of nut 17 (FIG. 6), rotation of the latter moves frame 1 relative to drawbar 12.

The independent design of the fixing mechanism, and location of the drive for moving frame 1 inside screw 4 of the fixing mechanism, makes it possible to reduce the size of the apparatus by 20–30 percent as compared to the conventional structures of this type, thus cutting its weight by 40–60 percent. This advantage is particularly important during cramped conditions of construction work, when lightness and maneuverability of the welding apparatus are vital. Simplicity of design, reliability and durability in operation, comparative ease of maintenance advantageously distinguish this apparatus from similar devices of this type.

What is claimed is:

1. An apparatus for welding nonrotatable pipe joints, comprising: a frame; a fixing mechanism rigidly connected with one of said pipes to be welded; a drive for moving said frame across the pipe joint to be welded mounted on said fixing mechanism and movably connecting said frame with said fixing mechanism; at least one circular guide rigidly secured on said frame; a rotary faceplate movably installed on said circular guide for setting the direction of rotation of said faceplate around the pipe joint; and a welding torch located on said faceplate and adapted to weld said pipe joint.

2. An apparatus for welding nonrotatable pipe joints as claimed in claim 1 wherein the drive to move said frame across the joint comprises: at least one guide rigidly attached to said frame and hinged to said fixing mechanism, and a drawbar kinematically communicating with said frame of the apparatus so, that this drawbar is capable of reciprocal movement with respect to said fixing mechanism.

3. An apparatus for welding nonrotatable pipe joints as claimed in claim 2, wherein said kinematic communication of said drawbar with said frame of the apparatus is realized in the form of a lever, one arm of which is connected to the guide of said drive, and the other arm to the drawbar of this drive.

4. An apparatus for welding nonrotatable pipe joints as claimed in claim 2, wherein said kinematic communication of said drawbar with said frame of the apparatus is accomplished through a link, whose one end is hinged to said frame of the apparatus, and the other end to said drawbar of the drive.

5. An apparatus for welding nonrotatable pipe joints as claimed in claim 2, wherein said kinematic communication of said drawbar with said frame of the apparatus comprises an Evans-type crank mechanism, having a connecting rod with its one end hinged to said drawbar of the drive, and the other end linked to said frame of the apparatus, while the crank is hinged to said connecting rod and to said fixing mechanism.

6. An apparatus for welding nonrotatable pipe joints as claimed in claim 2, wherein said kinematic communication of said drawbar with said drawbar of the apparatus is accomplished through a screw pair, one of the elements said screwpair being rigidly attached to said fixing mechanism, and the other element of said screw pair being hinged to said frame of the apparatus.

* * * * *